Jan. 8, 1935. E. A. DICKEY 1,986,799
HYDRAULIC BRAKE APPARATUS
Filed March 8, 1932
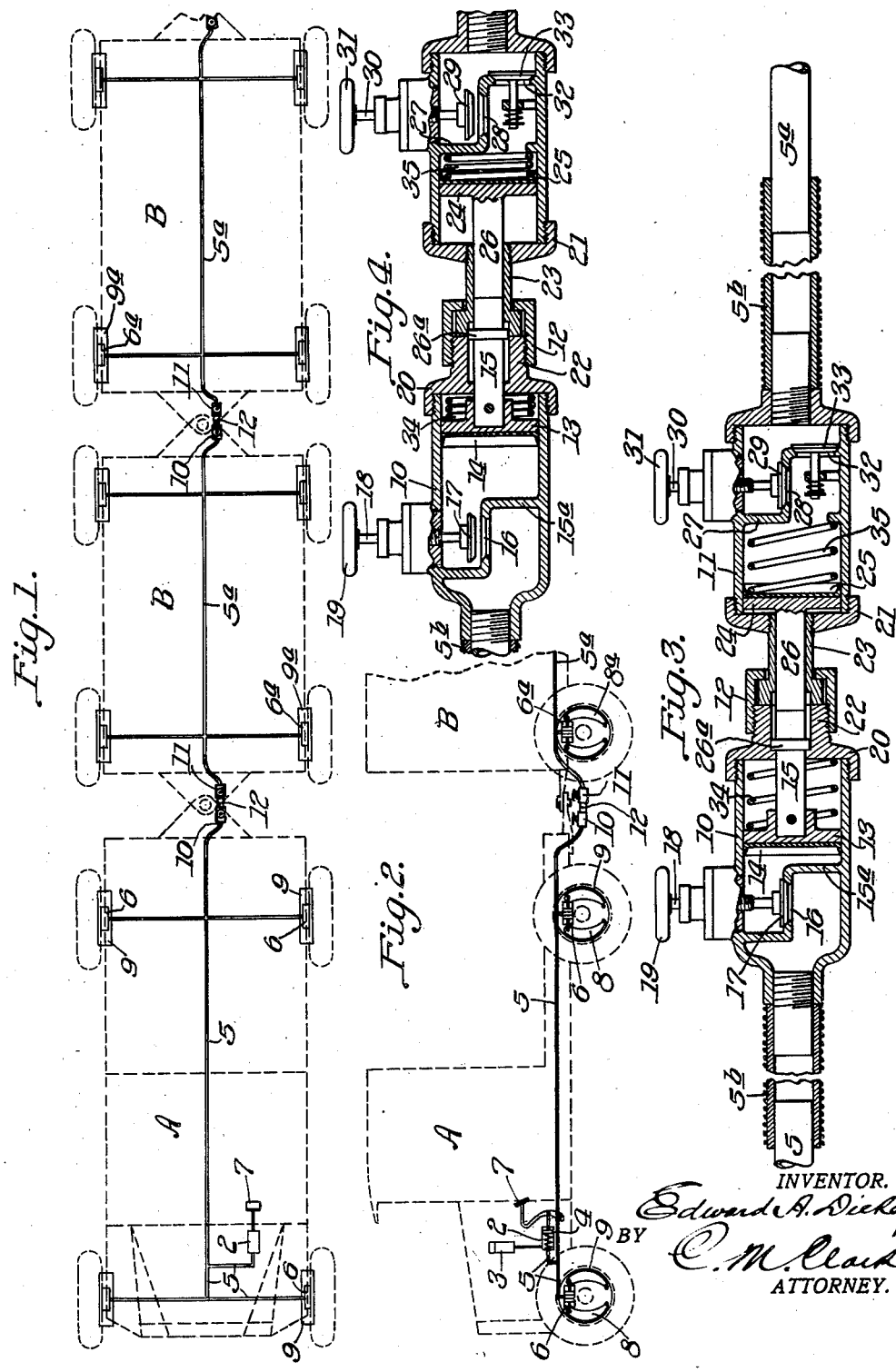

UNITED STATES PATENT OFFICE 1,986,799

HYDRAULIC BRAKE APPARATUS

Edward A. Dickey, Aliquippa, Pa.

Application March 8, 1932, Serial No. 597,515

12 Claims. (Cl. 188—3)

My invention consists of an improvement in hydraulic brake systems for use on motor driven vehicles, in connection with one or more trailers, constituting a train.

In systems of the same general kind, now in common use, hydraulic pressure is initially generated in a master cylinder, operated by the driver, and transmitted to the several braking elements through a piping system, for simultaneous application and release.

The master cylinder is fitted with a piston and wheel cylinders are each fitted with two opposed pistons operably connected with expanding shoes engaging the usual brake drums on each wheel. Cup packings are provided throughout, acting as a seal to maintain pressure and prevent loss of brake fluid. The brake pedal of the truck, when depressed, moves the piston of the master cylinder, displacing the brake fluid through the piping system and its flexible hose connections and transmitting an equal pressure to the several wheel cylinders of the truck and trailer or trailers. As pressure on the pedal is increased, greater hydraulic pressure is established within the wheel cylinders, with proportionate braking effect.

My improvement has in view to provide means whereby instead of direct hydraulic pressure being transmitted between each vehicle element of a train, through the coupling connection, the pressure is transmitted mechanically, each such element or member of the train utilizing an isolated hydraulic system of its own. The improvement also provides for maintaining effective braking action on each individual unit of a train, when detached or uncoupled, as in parking on a grade.

The invention is illustrated in the accompanying drawing, in which:

Fig. 1 is a diagrammatic plan view of a truck and a plurality of trailers, provided with my improved equipment;

Fig. 2 is a partial view in side elevation thereof;

Fig. 3 is a longitudinal sectional view, enlarged, showing two adjacent actuating cylinders, coupled together, in normal position;

Fig. 4 is a similar view, showing the parts in action under fluid pressure.

Referring to the drawing, A is a truck of conventional construction coupled to a plurality of trailers B, B. Truck A is provided with the usual master cylinder 2 of the compensating type communicating with a supply tank or reservoir 3 for replacement of additional fluid to counterbalance any loss due to gravity seepage. Master cylinder 2 is provided with a pedal-actuated piston 4 and communicates by piping 5 with the several wheel cylinders 6 of the truck, each of which is thus subject to the action of the displaced fluid of the line, by the action of pedal 7. The action of the opposed pistons of each truck cylinder on the braking shoes 8 of the usual drums 9 is well understood, and need not be further described.

Each trailer B is provided with a system of piping 5a, with sectional lengths of flexible hose connections or other suitable communicating links providing flexibility where necessary. Likewise each trailer is provided with a series of wheel cylinders 6a for actuation of the braking shoes 8a of each wheel, as on the truck A, each cylinder being in operative connection with the piping 5a, as shown.

The rear end of truck A and of each trailer B is provided with a cylinder 10, which I call a primary or impelling cylinder, and the front end of each trailer is provided with a cylinder 11, which I call a secondary or transmitting cylinder, flexibly connected with piping 5 and 5a respectively by a section of hose 5b. Each cylinder is thus flexibly connected with its pressure line, facilitating ample movement in traffic or in coupling and uncoupling.

Such pair of cylinders 10 and 11 are connected in any suitable manner, as by an easily operated coupling 12. Cylinder 10, when on the truck A is connected by a hose directly with the rear end of piping 5, or when on the rear end of a trailer, with the rear end of the hose connection of piping 5a.

Cylinder 11, at the front of the trailer, is connected by a similar hose and piping 5a with a cylinder 10 at the rear end of the trailer, whereby each trailer of a train is connected rearwardly with an adjacent trailer, or, whereby the first trailer is connected directly with the truck A.

Cylinder 10 is provided with an actuating plunger or piston head 13 having a flexible cup 14, as of rubber or the like, subject to pressure of fluid in line 5 or 5a by which rearward motion is transmitted to its stem 15. Between plunger 13 and the other end of cylinder 10 is interposed a partition 15 of any suitable construction having a communicating port 16 and a controlling valve or cock 17. In the construction shown, valve 17 is opened and closed by means of its stem 18 having an operating handle or wheel 19, the stem being suitably mounted and provided with packing, as in ordinary valve construction, as will be readily understood.

The rear end of cylinder 10 is provided with a closing head 20, and a similar closing head 21 forms the front terminal of cylinder 11, each of such heads 20 and 21 being provided with extensions 22 and 23 respectively, for tight coupling action by sleeve 12. In the front end of cylinder 11 is provided a head 24 and cup 25, like head 13 and cup 14, at the rear end of a stem 26 adapted to make abutting engagement against the rear end of stem 15. Stem 15 is also shouldered as at 26, limiting its forward movement for prevention of distortion of cup 14.

Cylinder 11 is likewise provided with a transverse partition 27 having a circulating port 28 opened and closed by valve 29 of an actuating stem 30, having a handle or wheel 31, and mounted in the usual conventional manner. Partition 27 of cylinder 11 is provided with a circulating port 32 opened under pressure and closed by a spring-actuated check-valve 33, adapted to close against return of fluid from line 5a when the valve 29 is closed. After the trailer is coupled to the truck, valve 29 may then be opened, releasing pressure on the trailer brakes and allowing for normal travel over the highway.

By such construction, with valve 29 seated, it is however possible to maintain continuous application of pressure through piping 5a indefinitely when any individual trailer is uncoupled. When coupled up in a train, and with valve 29 opened, the pressure in the trailer line of piping is released, opening the several brakes for free travel.

Reacting springs 34 and 35 are provided behind heads 13 and 24, adapted to be compressed when said heads are actuated by pressure, and to react against the heads, upon termination of fluid pressure against them, to resume normal position.

By the above described construction it will be obvious that with the several units of a train coupled together, both as to the usual pulling couplings and those of the fluid pressure brake system, the application of pressure through line 5 of the truck, upon pedal action, will be transmitted not only to the several truck braking members, but also through stems 15 and 26, moving plunger 24 of cylinder 11 backwardly and with resulting braking pressure in line 5a of the next adjacent and any additional trailers. When the truck is used alone and without a trailer, it is of course necessary to close valve 17 to confine the fluid in line 5 and the forward portion of cylinder 10.

The particular advantage of the mechanical transmission of power thus provided is, that each particular unit of the train may be uncoupled without danger of leakage, and when coupled, to provide for definite, positive and complete generation of active hydraulic pressure throughout the successive cylinders and piping connections to the several braking elements of each trailer.

The construction also provides for the uncoupling of any particular trailer for loading, unloading or parking, with continued maintenance of braking power and for release of such pressure in any individual unit, by merely opening the individual controlling valves 29.

The construction of the invention and its advantages of operation will be readily understood and appreciated by all those familiar with the use of trucks or similar vehicles in connection with truck-drawn trailers or the like. It is comparatively simple and efficient in operation, capable of coupling and uncoupling in a minimum of time, and with slight effort. The particular construction of the several cylinders and their parts may be changed or varied by the skilled mechanic or builder as to design, size, capacity or otherwise, but all such changes are to be understood as within the scope of the following claims.

What I claim is:

1. In combination with a motor actuated vehicle having a hydraulic conduit and means for generating pressure therein, a cylinder connected with the conduit having a plunger and a stem extending through the cylinder, a transverse partition between the plunger and the conduit connection having a port and a valve therefor, and a coupling terminal on the end of the cylinder.

2. In combination with a motor actuated vehicle having a hydraulic conduit and means for generating pressure therein, a cylinder connected with the conduit having a plunger and a stem extending through the cylinder, a limiting shoulder on the stem, a transverse partition between the plunger and the conduit connection having a port and a valve therefor, and a coupling terminal on the end of the cylinder.

3. In combination with a motor actuated vehicle having a hydraulic conduit and a cylinder connected with the conduit having a pedal-actuated plunger, a supplemental pressure transmitting cylinder communicating with the conduit having a plunger provided with a stem extending through the outer end of the cylinder, a retracting spring for the plunger, a transverse partition in the cylinder between the plunger and the conduit connection having a port, an opening and closing valve therefor, and a coupling terminal on the end of the cylinder for connection and disconnection with and from the service line of a second vehicle and corresponding opening or closing of said valve.

4. In hydraulic brake apparatus for motor vehicles, the combination with a cylinder having a coupling terminal and a fluid actuated plunger and stem, a cylinder coupled thereto having a coupling terminal and an abutting stem and a plunger, and a conduit connected with each of said cylinders and with braking mechanism, the coupling terminals of said cylinders forming reduced stem-guiding extensions thereof and having a separable coupling member engaging each of said reduced extensions.

5. In hydraulic brake apparatus for motor vehicles, the combination with a primary cylinder having a coupling terminal and a fluid actuated plunger and stem, a secondary cylinder coupled thereto having an abutting stem and a spring retracted plunger, a conduit connected with the opposite end of the secondary cylinder and with fluid actuated braking mechanism, and a transverse partition in the primary cylinder having a valve-controlled port.

6. In hydraulic brake apparatus for motor vehicles, the combination with a primary cylinder having a coupling terminal and a fluid actuated plunger and stem, a secondary cylinder coupled thereto having an abutting stem and a spring retracted plunger, a conduit connected with the opposite end of the secondary cylinder and with fluid actuated braking mechanism, and a transverse partition in the secondary cylinder having a circulation port and a check valve therefor.

7. In hydraulic brake apparatus for motor vehicles, the combination with a primary cylinder having a coupling terminal and a fluid actuated plunger and stem, a secondary cylinder coupled thereto having an abutting stem and a spring retracted plunger, a conduit connected with the opposite end of the secondary cylinder and with fluid actuated braking mechanism, and a transverse partition in the secondary cylinder having a circulation port and a check valve therefor and a separate port provided with a positively opening and closing valve.

8. In combination with a motor actuated vehicle provided with a hydraulic piping system having a terminal cylinder and a movable plunger and stem therein, a trailer coupled to the vehicle having a separate piping system provided with a cylinder separably connected to said cylinder and having a movable plunger and stem in abutting engagement with the stem of the motor actuated vehicle cylinder, each of said cylinders having a reduced longitudinal stem-guiding extension, and connecting means therefor.

9. In combination with a motor actuated vehicle provided with a hydraulic piping system having a terminal cylinder and a movable plunger and stem therein, a trailer coupled to the vehicle having a separate piping system provided with a cylinder separably connected to said cylinder and having a movable plunger and stem in abutting engagement with the stem of the motor actuated vehicle cylinder and provided at the opposite terminal of the piping system with a terminal cylinder and a movable plunger and stem for connection with an adjacent cylinder, each of said cylinders having a reduced longitudinal stem-guiding extension adapted to be brought into abutting coupling engagement with the similar extension of an adjacent similar cylinder.

10. In hydraulic brake apparatus for motor vehicles provided with self-contained hydraulic pressure generating means having a terminal plunger cylinder and a plunger having a stem extending through the cylinder, the combination therewith of separable hydraulic pressure generating means having a terminal cylinder coupled thereto provided with a plunger and a stem engageable by said stem, a conduit connected with the opposite end of the last named cylinder and with fluid-actuated braking mechanism, each of said cylinders having a circulation controlling port and valve, a reduced longitudinal stem-guiding extension, and connecting means therefor.

11. In hydraulic brake apparatus for plural coupled vehicles, a motor actuated vehicle having a piping system connected with fluid-actuated brakes and means for generating pressure in the system, a communicating cylinder having a plunger actuated stem and a coupling terminal, a second vehicle having a piping system connected with fluid-actuated brakes having a communicating cylinder provided with a stem actuated plunger and a coupling terminal for attachment to the first named cylinder, each of said cylinders having self-contained means for opening and closing pressure between its piping system and its plunger.

12. In hydraulic brake apparatus for vehicles comprising a motor truck and a trailer having a piping system connected with fluid actuated brakes, a transmitting cylinder connected with the system having a stem actuated plunger and a coupling terminal for attachment to an impelling cylinder of a preceding vehicle, said transmitting cylinder having means for opening and closing pressure between its piping system and its plunger, the impelling cylinder having a plunger actuated stem and a coupling terminal, and means embodied in said last mentioned cylinder for opening and closing pressure from the piping system of the vehicle to and from its plunger actuated stem.

EDWARD A. DICKEY.